(12) United States Patent  
Cusack

(10) Patent No.: US 8,042,823 B2
(45) Date of Patent: Oct. 25, 2011

(54) SUSPENSION BICYCLE SEAT POST

(75) Inventor: Douglas A. Cusack, Cottage Grove, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 11 days.

(21) Appl. No.: 12/652,830

(22) Filed: Jan. 6, 2010

(65) Prior Publication Data

US 2011/0163515 A1 Jul. 7, 2011

(51) Int. Cl.
 *B62K 19/36* (2006.01)
(52) U.S. Cl. .................. 280/283; 280/281.1; 297/195.1
(58) Field of Classification Search .............. 280/281.1, 280/283, 274, 275, 226.1; 297/195.1, 199, 297/209; 267/131, 132; 248/219.2, 560, 248/577, 584, 594, 602, 601
See application file for complete search history.

(56) References Cited

U.S. PATENT DOCUMENTS

| | | | |
|---|---|---|---|
| 3,467,421 A | 9/1969 | Bentley | |
| 3,642,268 A | 2/1972 | Hipsher | |
| 3,881,711 A | 5/1975 | Lemaitre | |
| 3,998,503 A | 12/1976 | Van Wyk | |
| 5,044,648 A | 9/1991 | Knapp | |
| 5,224,790 A | 7/1993 | Hein | |
| 5,489,139 A | 2/1996 | McFarland | |
| 5,660,406 A | 8/1997 | Menze, sen. | |
| 5,702,093 A * | 12/1997 | Liao | 267/132 |
| 5,823,618 A | 10/1998 | Fox et al. | |
| 5,833,255 A | 11/1998 | Sarder et al. | |
| 5,855,363 A | 1/1999 | Svendsen | |
| 5,921,145 A | 7/1999 | Muser | |
| 6,032,934 A * | 3/2000 | Wu | 267/132 |
| 6,070,895 A | 6/2000 | Newman et al. | |
| 6,089,656 A | 7/2000 | Hals | |
| 6,095,538 A | 8/2000 | Maret | |
| 6,145,858 A | 11/2000 | Foulquier | |
| 6,176,476 B1 | 1/2001 | Wang | |
| 6,209,858 B1 | 4/2001 | Fujii | |
| 6,270,065 B1 * | 8/2001 | Hals | 267/132 |
| 6,349,957 B2 | 2/2002 | Smith | |
| 6,378,853 B1 | 4/2002 | Kammel et al. | |
| 6,409,130 B1 | 6/2002 | Maret | |

(Continued)

FOREIGN PATENT DOCUMENTS

WO WO 2009/029115 A1 5/2009

OTHER PUBLICATIONS

"BioFloat Seatpost" http://www.cantitoeroad.com/catalog/product_info.php?manufacturers_id=17&products_id=126&osCsid=06cd65db65.

*Primary Examiner* — Paul N Dickson
*Assistant Examiner* — Tashiana Adams
(74) *Attorney, Agent, or Firm* — Boyle Fredrickson, S.C.

(57) ABSTRACT

A bicycle seat post assembly that dampens movement between a seat and a bicycle frame. The seat post assembly includes a seat post, a collar that passes through the seat post, and a dampener that is disposed between the collar and the seat post. The collar is pivotably connected to the seat post so that the collar can rotate relative to the seat post. The collar rotates about an axis that extends in a crossing direction relative to both a longitudinal axis of the bicycle frame and a longitudinal axis of the seat post.

21 Claims, 5 Drawing Sheets

U.S. PATENT DOCUMENTS

| | | |
|---|---|---|
| 6,412,762 B2 | 7/2002 | De Fontenay |
| 6,575,441 B2 | 6/2003 | Lefebvre |
| 6,786,542 B1 | 9/2004 | Nuzzarello |
| 6,848,701 B2 | 2/2005 | Sinyard et al. |
| 6,988,740 B2 | 1/2006 | Bobrovniczky |
| 7,121,622 B1 | 10/2006 | Mendez |
| 7,125,030 B2 | 10/2006 | D'Aluisio et al. |
| 7,144,029 B1 * | 12/2006 | Heady .................. 280/288.4 |
| 7,431,390 B2 | 10/2008 | Martin et al. |
| 7,513,568 B2 | 4/2009 | Hung |
| 7,681,899 B2 * | 3/2010 | Fujiwara ................ 280/283 |
| 2002/0084620 A1 * | 7/2002 | Yu et al. ................ 280/283 |
| 2004/0007847 A1 | 1/2004 | Sinyard et al. |
| 2005/0017479 A1 * | 1/2005 | Liu ................ 280/287 |
| 2010/0199481 A1 * | 8/2010 | Petrie et al. ................ 29/428 |

* cited by examiner

SUSPENSION BICYCLE SEAT POST

BACKGROUND OF THE INVENTION

The present invention relates generally to bicycles and, more particularly, to a bicycle seat post or handlebar suspension assembly that reduces shocks from being communicated between the bicycle frame and the rider.

The primary structural component of a conventional two-wheel bicycle is the frame. Most bicycles are defined by a frame that is typically constructed from a set of tubular members that are connected together. For many bicycles, the frame is constructed from members commonly referred to as the top tube, down tube, seat tube, seat stays and chain stays, and those members are joined together at intersections commonly referred to as the head tube, seat post, bottom bracket and rear dropout. A front wheel and a rear wheel are generally attached at forward and rearward locations, respectively, with respect to frame. A handlebar and a seat extend in an upward direction from the frame at locations that are generally between the front and rear wheels. The handlebar cooperates with a fork assembly to effectuate steering of the bicycle and the seat is oriented rearward of the handlebar and commonly supports a majority of the weight of the rider. In most configurations, the seat is generally rigidly attached to a stem tube or seat post that telescopically cooperates with a seat tube of the bicycle frame.

The increased popularity in recent years of cycling, particularly on mountains and cross-country, has made shock absorbing systems in many instances a biking necessity. Many bicycles intended for off-road use are provided with fairly aggressive and complex shock or linkage systems that accommodate vertical movement of the front wheel and/or the rear wheel with respect to the bicycle frame. Although such systems dampen energy communicated to the frame of the bicycle, such systems do little to dampen vibration between the frame and the structures that interact with the rider, such as the handlebars or the seat. Others, having recognized such a shortcoming, have attempted to adapt the motion dampening strategies associated with mounting the wheels to the frame of the bicycle to connections between the seat and handlebars and the frame. Many such configurations have drawbacks that outweigh their perceived advantages.

One approach to dampening motion between the seat and the bicycle frame has been to provide a linear spring or shock assembly that is captured by the seat tube of the bicycle frame. Still another approach has been to provide a deformable suspension linkage between fixed connections of the seat and/or handlebars and the bicycle frame. Such configurations generally have a number of moveable parts, require more complex seat post constructions and/or require extensive assembly in order to achieve the desired dampened motion between the seat and the frame.

Another approach has been to provide a dampening media that is captured by the seat tube or steer tube but does not otherwise interfere with the connection of the seat or handlebars to the underlying bicycle. Such systems are only capable of dampening vibrations associated with the seat post and do not accommodate dampening of impact shocks that can occur between the seat or handlebars and the frame as the wheels encounter more than inconsequential discontinuities along the ground surface.

Still others provide a vibrational isolation mount assembly that is disposed between fairly rigid connections of the bicycle seat or handlebars and the bicycle frame. International Publication No. WO 2009/029115 discloses one such system. Unfortunately, such systems are also not without their respective drawbacks. Although such systems provide a fairly robust connection between the bicycle seat and the seat post and the seat post and the bicycle frame, such systems include a deformable connection between the seat and seat post rigid mountings. The deformable connection provides limited but nearly infinite directional translation of the seat or handlebars relative to the frame. Although such systems isolate the seat from frame vibrations, the omni-directional instability of the vibration isolation system detracts from the ability of a rider to interact with the bicycle frame in a manner in which they are accustomed.

Therefore, there is a need for a bicycle seat post or handlebar suspension assembly that provides vibrational and impact dampening between the bicycle frame and the user interface. There is a further need for a seat post assembly that provides vibration dampening but maintains responsiveness to rider interaction with the seat and/or handlebars.

BRIEF DESCRIPTION OF THE INVENTION

The present invention provides a suspension bicycle seat post assembly that overcomes one or more of the aforementioned drawbacks. In one aspect, a bicycle seat post assembly is disclosed that dampens movement between a seat and a bicycle frame. The seat post assembly includes a seat post, a collar that passes through the seat post, and a dampener that is disposed between the collar and the seat post. The collar is pivotably connected to the seat post so that the collar can rotate relative to the seat post. The collar rotates about an axis that extends in a crossing direction relative to both a longitudinal axis of the bicycle frame and a longitudinal axis of the seat post. Such a construction allows pivoting motion of the seat but prevents side-to-side motion of the seat relative to the bicycle frame.

Another aspect of the invention that is useable with one or more of the aspects described above discloses a bicycle seat post assembly that includes a seat post, a tube, a hinge, and a shock member. The seat post includes a first portion and a second portion. The second portion has an elongate shape formed about a longitudinal axis and is adapted to cooperate with a seat tube of a bicycle frame. A passage is formed through the first portion of the seat post about an axis that is oriented in a crossing direction relative to the longitudinal axis of the second portion. The tube is positioned in the passage and adapted to attach a bicycle seat to the bicycle frame. The hinge connects the tube and the seat post and defines an axis of rotation of the tube with respect to the seat. The shock member is positioned in the passage between the tube and the seat post and dampens movement of the bicycle seat relative to the bicycle frame.

A further aspect of the invention that can be combined with one or more of the above aspects discloses a bicycle assembly having a frame with a seat tube formed between a front wheel and a rear wheel that are attached to the frame. The bicycle assembly includes a seat post assembly that includes a stem, a collar, a shock dampener, and a hinge. The stem has a head portion and a stem portion that telescopically cooperates with the seat tube of the frame. A passage is formed through the head portion of the stem and extends in a direction that crosses a longitudinal axis of the frame and the collar is positioned within the passage. The shock dampener extends about at least a portion of the circumference of the collar between the collar and the head portion of the stem. The hinge connects the collar and the stem and a seat is secured to the collar and rotatable about the hinge relative to the frame.

Another aspect of the invention that can be combined with one or more of the above aspects discloses a method of dampening motion between a bicycle seat and a bicycle frame comprising. A seat post is formed with an opening about an axis that extends in a crossing direction with respect to a longitudinal axis of a stem portion of the seat post. The stem portion is adapted to telescopically cooperate with a seat tube of a bicycle frame. A seat mount is passed through the opening of the seat post and a damper is positioned between the seat mount and the seat post. The seat mount and the seat post are connected with a hinge that has a hinge pivot axis that is parallel to the axis of the opening of the seat post.

In a preferred aspect of the invention combinable with one or more of the above aspects, the pivotable connection between the tube or collar and the stem is formed by an over-centered association between portions of the tube or collar and the seat post. More preferably, the hinge is offset forward or reward of a vertical plane that passes through longitudinal axis of the tube. More preferably, the pin of the hinge is formed by an extension of the tube and the barrel of the hinge is formed by cavity formed in the seat post.

In another preferred aspect combinable with one or more of the aspects above, the interface between the shock member and one or more of the collar and the seat post includes an index that laterally aligns the shock member with one or each of the collar and the seat post. The index includes a key and groove association that, when mated, laterally align the tube, shock member, and stem tube. In another preferred aspect, the dampener or shock member extends about the entire circumference of the tube between the tube and the stem. Preferably, the shock member has a cross-sectional thickness that is thicker at locations that are circumferentially offset from the hinge.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

DETAILED DESCRIPTION OF THE PREFERRED EMBODIMENT

Figure 1:
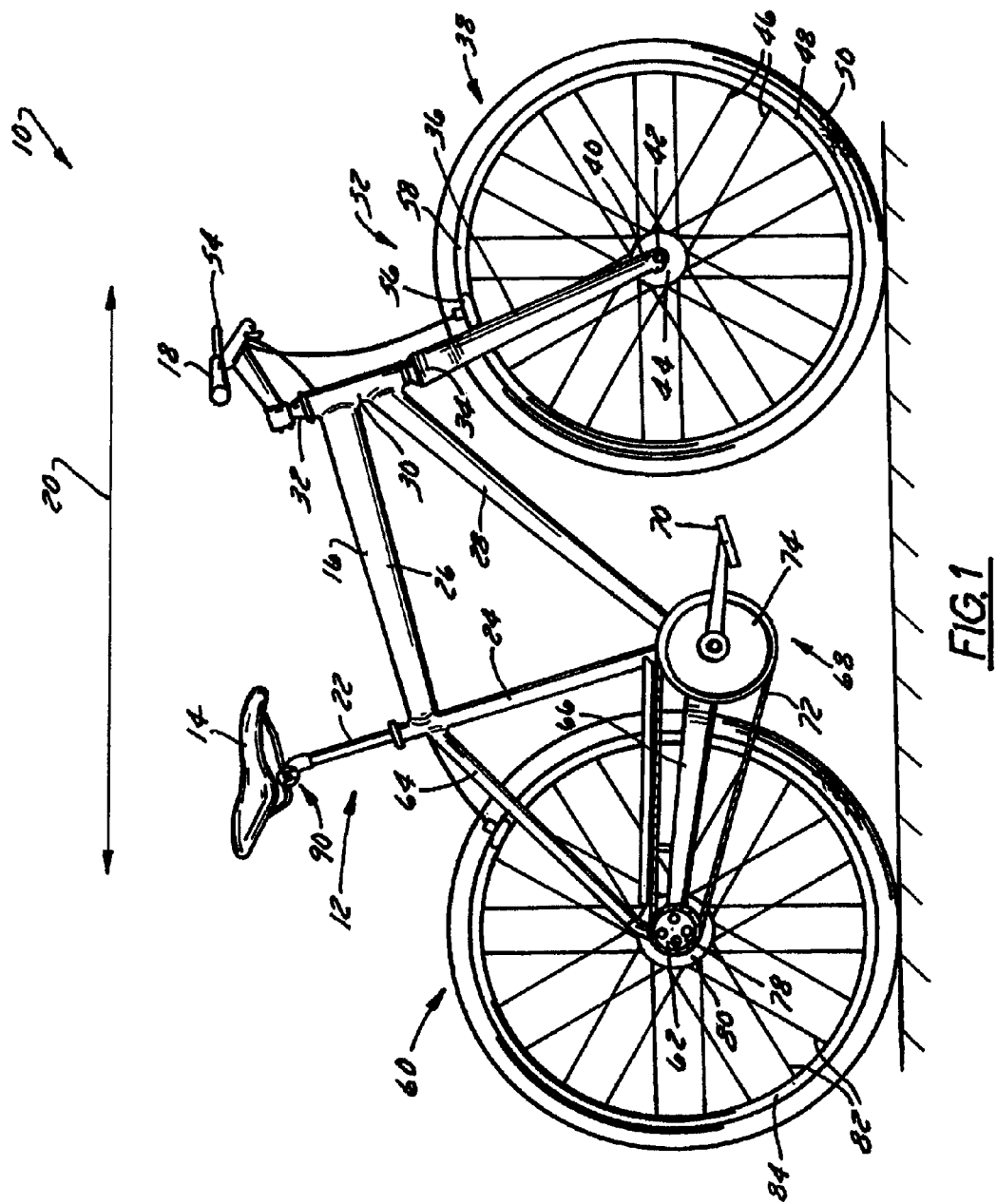
FIG. 1 is an elevation view of a bicycle equipped with a suspension seat post assembly according to the present invention.

FIG. 1 shows a bicycle 10 having a seat post assembly 12 that is constructed according to the present invention. Seat post assembly 12 attaches a seat 14 to a frame 16 of bicycle 10. Handlebars 18 are attached to frame 16 generally forward of seat 14 with respect to a longitudinal axis, indicated by arrow 20, of bicycle 10. Seat post assembly 12 includes a seat post 22 that slidably or telescopically engages a seat tube 24 of frame 16. Frame 16 includes a top tube 26 and a down tube 28 that extend forwardly from seat tube 24 to a head tube 30 that connects the generally forward ends of top tube and down tube 26, 28.

Handlebars 18 are connected to a stem 32 that passes through head tube 30 and engages a fork crown 34. A pair of forks 36 extend from generally opposite ends of fork crown 34 and are constructed to support a front wheel assembly 38 at an end thereof or fork tip 40. Fork tips 40 engage generally opposite sides of an axle 42 that is constructed to engage a hub 44 of front wheel assembly 38. A number of spokes 46 extend from hub 44 to a rim 48 of front wheel assembly 38. A tire 50 is engaged with rim 48 such that rotation of tire 50, relative to forks 36, rotates rim 48 and hub 44.

Bicycle 10 includes a front brake assembly 52 having an actuator 54 attached to handlebars 18 and a pair of brake pads 56 positioned on generally opposite sides of front wheel assembly 38. Brake pads 56 are constructed to engage a brake wall 58 of rim 48 thereby providing a stopping or slowing force to front wheel assembly 38.

Bicycle 10 includes a rear wheel assembly 60 that is positioned generally concentrically about a rear axle 62 such that rear wheel assembly 60 rotates about rear axle 62. A seat stay 64 and a chain stay 66 offset rear axle 62 from a crankset 68. Crankset 68 includes a set of pedals 70 that is operably connected to a chain 72 via a one or more variable diameter chain ring or sprocket gears 74. Rotation of chain 72 communicates a drive force to a gear cluster 78 positioned at a rear section of bicycle 10. Gear cluster 78 is generally concentrically orientated with respect to rear axle 62 and can include one or more variable diameter gears.

Gear cluster 78 is operationally connected to a hub 80 of rear wheel assembly 60. Rear wheel assembly 60 includes hub 80, a number of spokes 82, and a rim 84. Each of the number of spokes 82 extend between hub 80 and rim 84 and communicate the loading forces therebetween. As is commonly understood, rider operation of pedals 70 drives chain 72 thereby driving rear wheel assembly 60 which in turn propels bicycle 10. It should be readily apparent that bicycle 10 is shown as what is commonly understood as a road bike or bicycle configured for operation primarily on paved surfaces. However, it is further appreciated that bicycle 10 could also be formed as an off-road or mountain bike and that a suspension seat post assembly according to the present invention is applicable across various bicycle configuration platforms.

Those skilled in the art will appreciate that, regardless of the use-specific configuration of bicycle 10, during operation of bicycle 10, impacts subjected to front and rear wheel assemblies 38, 60 are communicated to a rider via the rider's interaction with seat 14 and handlebars 18. To reduce rider fatigue and discomfort associated with vibrations communicated to seat 14, seat post assembly 12 includes a suspension mount arrangement 90 that secures seat 14 to seat post 22 in a manner that allows limited movement therebetween.

Figure 2:
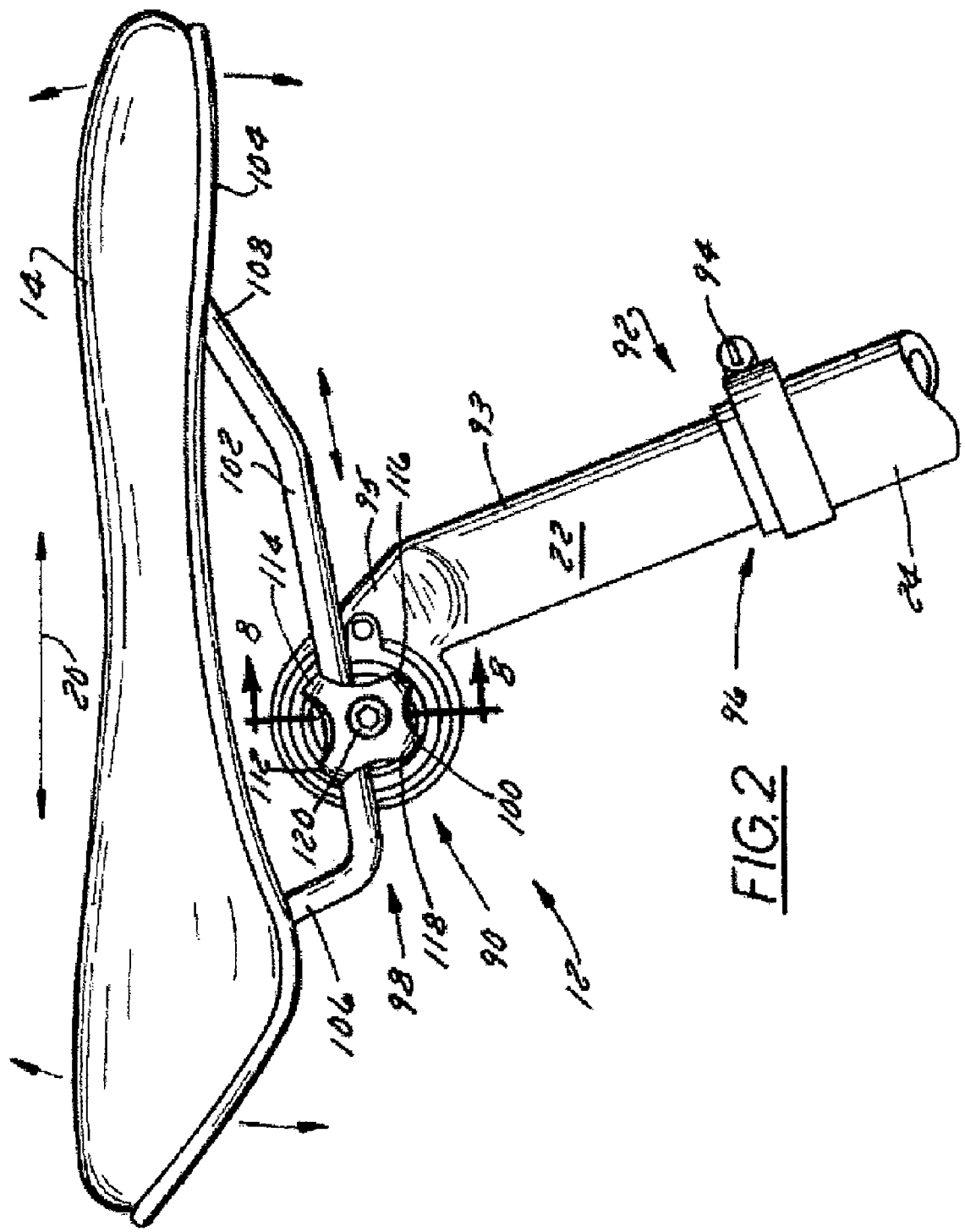
FIG. 2 is elevation view of the seat assembly removed from the bicycle shown in FIG. 1.
Figure 3:
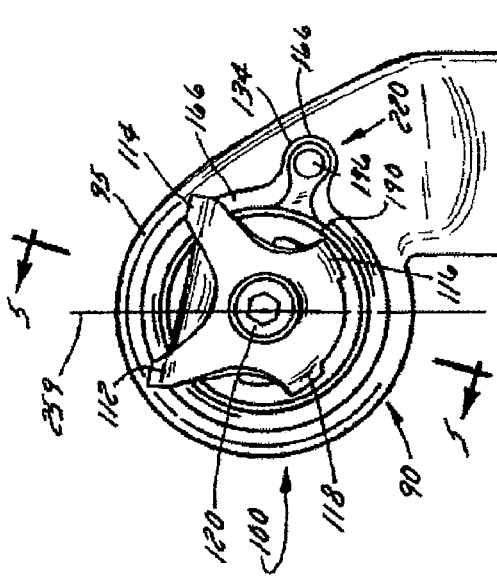
FIG. 3 is a view similar to FIG. 2 and shows the seat post assembly with the seat removed from the seat clamp assembly that remains engaged therewith.

As shown in FIGS. 2 and 3, seat post 22 includes a first or stem portion 93 and a second portion or head portion 95 that is positioned near an end of stem portion 93. As used herein, stem portion 93 is that portion of seat post 22 that can be received in seat tube 24 and head portion 95 is that portion of seat post 22, by virtue of its shape or contour, that cannot engage seat tube 24 when stem portion 93 is engaged therewith. A first end 92 of seat post 22 is associated with stem portion 93 and is telescopically received in seat tube 24 of bicycle frame 16. A clamp mechanism 94 is positioned about an opening 96 defined by seat tube 24. Clamp mechanism 94 compresses seat tube 24 about seat post 22 so as to define the generally vertical orientation of seat 14 with respect to frame 16. It is appreciated that seat post 22 and seat tube 24 could have any of a variety of complimentary shapes.

A second end 98 of seat post 22 is formed proximate head portion 95 and is generally opposite first end 92. Suspension mount arrangement 90 is secured to seat post 22 proximate second end 98 and is generally remote or offset from first end 92. A removable seat rail clamp assembly 100 cooperates with mount arrangement 90 and engages a pair of seat rails 102 that extend from an underside 104 of seat 14. Those skilled in the art will appreciate that seat rail clamp assembly 100 is but one example of a rail clamp assembly useable with the present invention.

Rails 102 extend from an underside 104 of seat 14. A first end 106 and a second end 108 of each rail 102 is secured to seat 14 at locations that are generally forward and rearward of mount arrangement 90 with respect to longitudinal axis 20. As described further below with respect to FIGS. 6 and 7, rail clamp assembly 100 includes a number of arms 112, 114, 116, 118 that are constructed to capture the alternate lateral rails 102 of seat 14 so as to secure seat 14 relative to suspension mount arrangement 90. As described further below, a fastener 120 passes through rail clamp assembly 100 and is operable so that rails 102 and rail clamp assembly 100 can be conveniently and selectively secured with respect to suspension mount arrangement 90 and seat post 22. That is, those skilled in the art will appreciate that loosening fastener 120, allows forward or rearward tilting of seat 14 relative to suspension mount arrangement 90. Seat rail clamp assembly 100 is configured to be infinitely positionable with respect to suspension mount arrangement 90.

Figure 4:
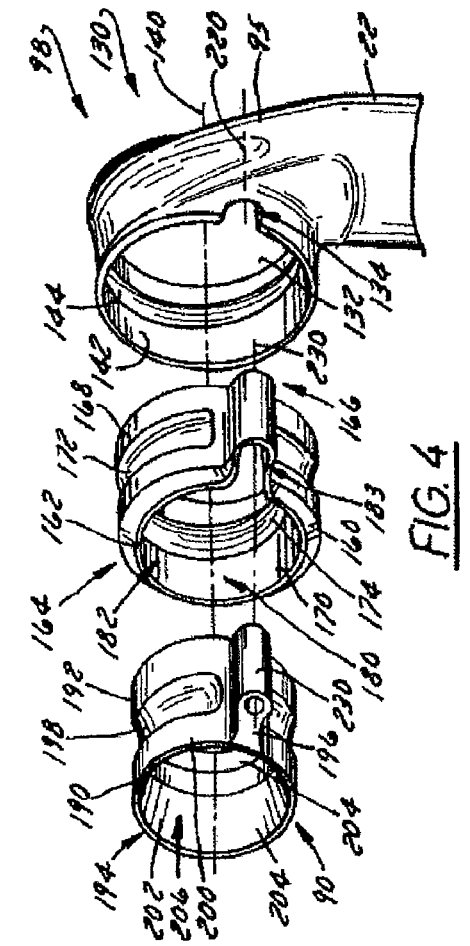
FIG. 4 is an exploded perspective view of a seat end of the seat post assembly shown in FIG. 3.
Figure 5:
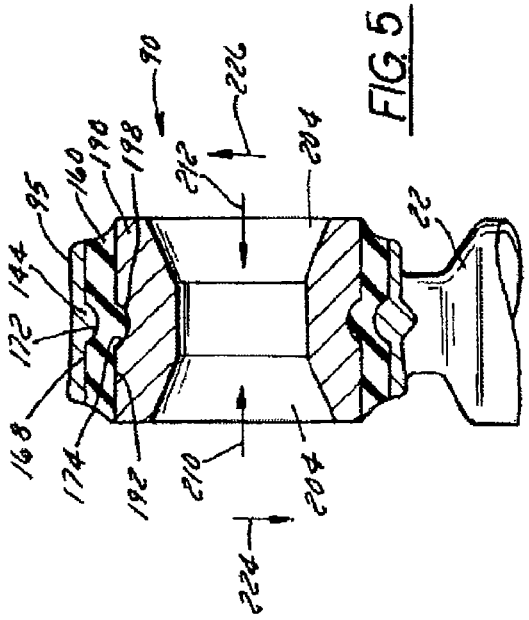
FIG. 5 is a cross sectional view of the portion of the seat post assembly shown in FIG. 4 and taken along line 5-5 shown in FIG. 3.

FIGS. 4 and 5 show suspension mount arrangement 90 with rail clamp assembly 100 removed therefrom. FIG. 4 shows the exploded suspension mount arrangement 90 and FIG. 5 is a radial cross-section view of the assembled suspension mount arrangement 90 taken along line 5-5 shown in FIG. 3. Referring to FIG. 4, suspension mount arrangement 90 includes a passage 130 that is formed through head portion 95 of seat post 22. Passage 130 includes a first section or portion 132 and a second section or portion 134 that are fluidly connected to one another. Passage 130 is formed along an axis 140 that extends in a lateral or crossing direction with respect to longitudinal axis 20 as shown in FIG. 2. Those skilled in the art will appreciate that the lateral direction is commonly associated with the left and right sides of a bicycle and is generally orthogonal to longitudinal direction 20 of bicycle 10.

Head portion 95 of seat post 22 includes a surface 142 that faces passage 130. Surface 142 includes an index or rib 144 and extends further into passage 130 than a majority of surface 142. As described below, rib 144 provides indexing of a shock, shock member, or suspension member 160 with respect to passage 130 and with respect to lateral directions aligned with axis 140.

Suspension member 160 is preferably formed by a continuous body 162 and includes a first section or portion 164 and a second section or portion 166. Although body 162 is shown as being circumferentially continuous, it is appreciated that body 162 could be provided in a non-continuous manner wherein one or more of first and second portions 164, 166 are provided as isolated elements. It should further be appreciated that first portion 164 of body 166 has a thicker radial dimension than second portion 166 of body 162. Said in another way, second portion 166 of body 162 is preferably thinner than first portion 164 of body 166.

Body 162 of suspension member 160 includes a radially outward directed or exterior surface 168 and a radially inward or interior directed surface 170. A channel or groove 172 is formed along at least a portion of the circumference of body 162 in exterior surface 168 and interior surface 170 includes a rib 174 and extends in a radially inward direction with respect to a majority of interior radially interior directed surface 170 of body 162. As described further below, groove 172 and rib 174 positionally index suspension member 160 with respect to both head portion 95 and a tube or collar 190 of mount arrangement 90.

Body 162 of suspension member 160 defines a passage 180 having a first portion 182 and a second portion 183. Passage 180 extends in a direction that is generally aligned with axis 140. Collar 190 of mount arrangement 90 is received in passage 180 formed by suspension member 160. Collar 190 includes a body 192 having a first portion 194 that is configured to cooperate with first portion 182 of passage 180 and a second portion 196 that is configured to cooperate with second portion 183 of passage 180. Body 192 is preferably a continuous unitary part and includes a circumferentially oriented groove 198 formed on at least a portion of a radially directed exterior surface 200 of body 192. A pair of tapered surfaces or lands 204 are formed on an interior surface 202 of body 192. Lands 204 are each inclined in a longitudinally outward direction that is generally aligned along axis 140. Said in another way, lands 204 form truncated frustro-conical surfaces on a radially interior directed surface of body 192. A passage 206 is formed through body 192. Passage 206 is shaped to removably cooperate with seat rail clamp assembly 100.

Preferably, each of stem 22 and collar 190 are formed from generally rigid and robust materials such as metal-type materials and/or carbon fiber type materials. Comparatively, suspension member 160 is preferably constructed of elastomeric, rubber, or other shock or vibration dampening material. Preferably, suspension member 160 is somewhat deformable but is robust enough to withstand static rider loading.

As shown in FIG. 5, when assembled, rib 144 formed on surface 142 of head portion 95 snugly cooperates with groove 172 formed by radially outward directed surface 168 of suspension member 160. The radially inward directed rib 174 formed on suspension member 160 snugly cooperates with groove 198 formed on the radially outward facing surface 200 of collar 190. Suspension member 160 is somewhat deformable to allow compression stacking of the suspension mount arrangement 90 via translation of collar 190 and suspension member 160 in either of axial directions 210, 212 with respect to head portion 95. The interaction of the various ribs and grooves laterally indexes each of head portion 95, suspension member 160, and collar 190 relative to one another. It is appreciated that the shape, arrangement, and number of ribs and grooves could be provided in virtually a limitless number of orientations.

As best shown in FIG. 3, second portions 196 and 166 of collar 190 and suspension member 160 cooperate with second portion 134 of passage 130 formed in head portion 95 of seat post 22 and define a hinge assembly, hinged connection, or simply a hinge 220 between collar 190 and seat post 22.

Hinge 220 limits the available motion of collar 190 relative to seat post 22 and suspension member 160 dampens motion within the range of the limited available motion. Said another way, hinge 220 prevents dissimilar lateral movements, indicated by arrows 224, 226 in FIG. 5, of collar 190 relative to seat post 22. Hinge 220 and shock member 160 cooperate to dampen movement between collar 190 and seat post 22 in a manner that maintains a generally level horizontal orientation of the alternate lateral sides 272, 274 of seat 14. Seat 14 and seat rail clamp assembly 100 having limited motion based on rotation of collar 190 relative to head portion 95 about an axis 230 defined by hinge 220 as described further below with respect to FIG. 8.

Although hinge 220 is shown as being generally forward of longitudinal axis 259, it is envisioned that hinge 220 could be positioned anywhere along the circumferential space between collar 160 and head portion 95. Those skilled in the art would appreciate that a hinge configuration as shown in FIG. 3 would be more beneficial to those riders that prefer to interact with more rearward positions of seat 14. It should also be understood that orienting hinge 220 rearward of axis 259 would provide better comfort and performance for those riders that prefer to be supported by the more forward or nose portions of seat 14. Understandably, moving hinge 220 about the circumferential interface between collar 190 and head portion 95 alters the position of the axis of rotation associated with suspension mount arrangement 90 thereby providing different dampening performance. It is further envisioned that head portion 95 could be provided with more than one recess that cooperates with the pin portion of hinge 220. Such a configuration would provide a single seat post assembly that could be configured to provide a number of unique suspension configurations.

Figure 6:
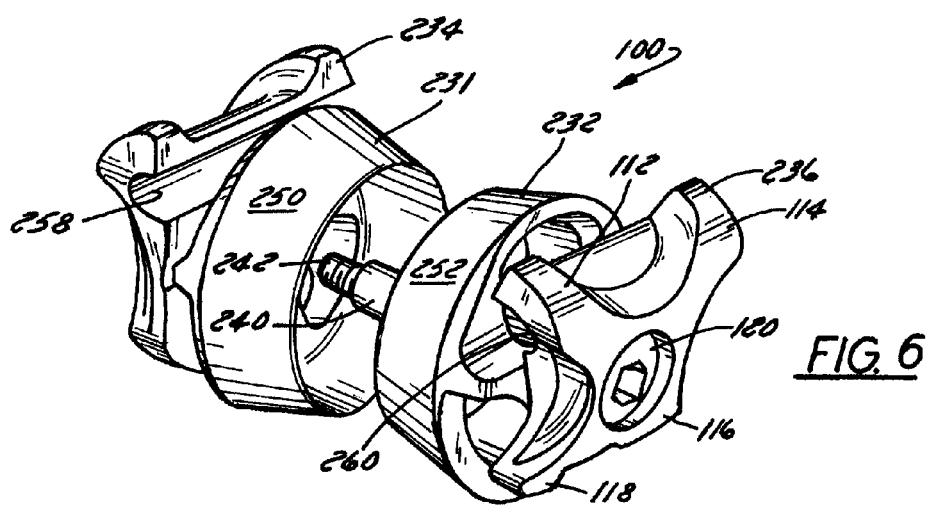
FIG. 6 is a perspective view of the seat rail clamp assembly shown in FIG. 3.
Figure 7:
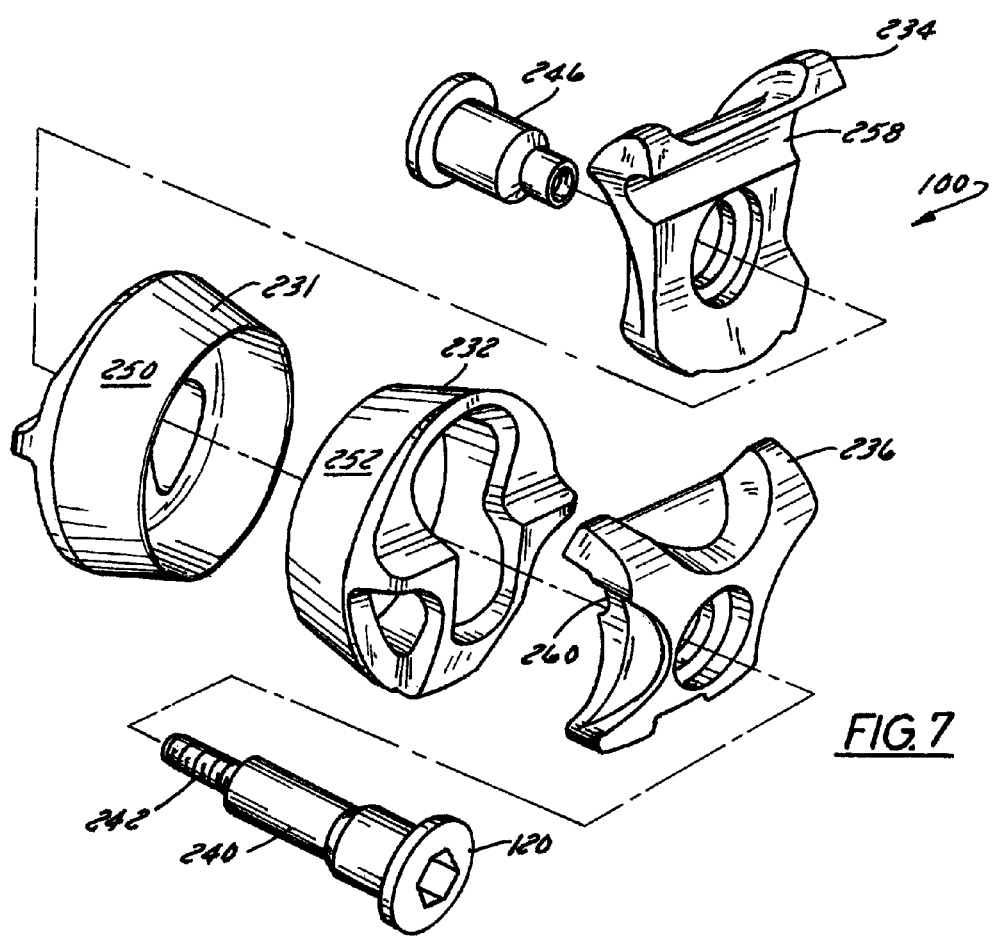
FIG. 7 is an exploded perspective view of the seat rail clamp assembly shown in FIG. 6.

FIGS. 6 and 7 show rail clamp assembly 100 removed from mount arrangement 90 of seat post 22. Rail clamp assembly 100 includes a pair of wedge bodies 231, 232 and a pair of clamp bodies 234, 236 that are positioned laterally outboard relative to wedge bodies 231, 232. Fastener 120 includes a stem portion 240 and a threaded portion 242 that threadingly cooperates with a shaft nut 246 that engages clamp assembly 100 from a direction laterally opposite fastener 120. Each wedge body 231, 232 includes a tapered surface 250, 252 that cooperates in a generally planer manner of the tapered surfaces or lands 204 of collar 190 as shown in FIG. 5.

Figure 8:
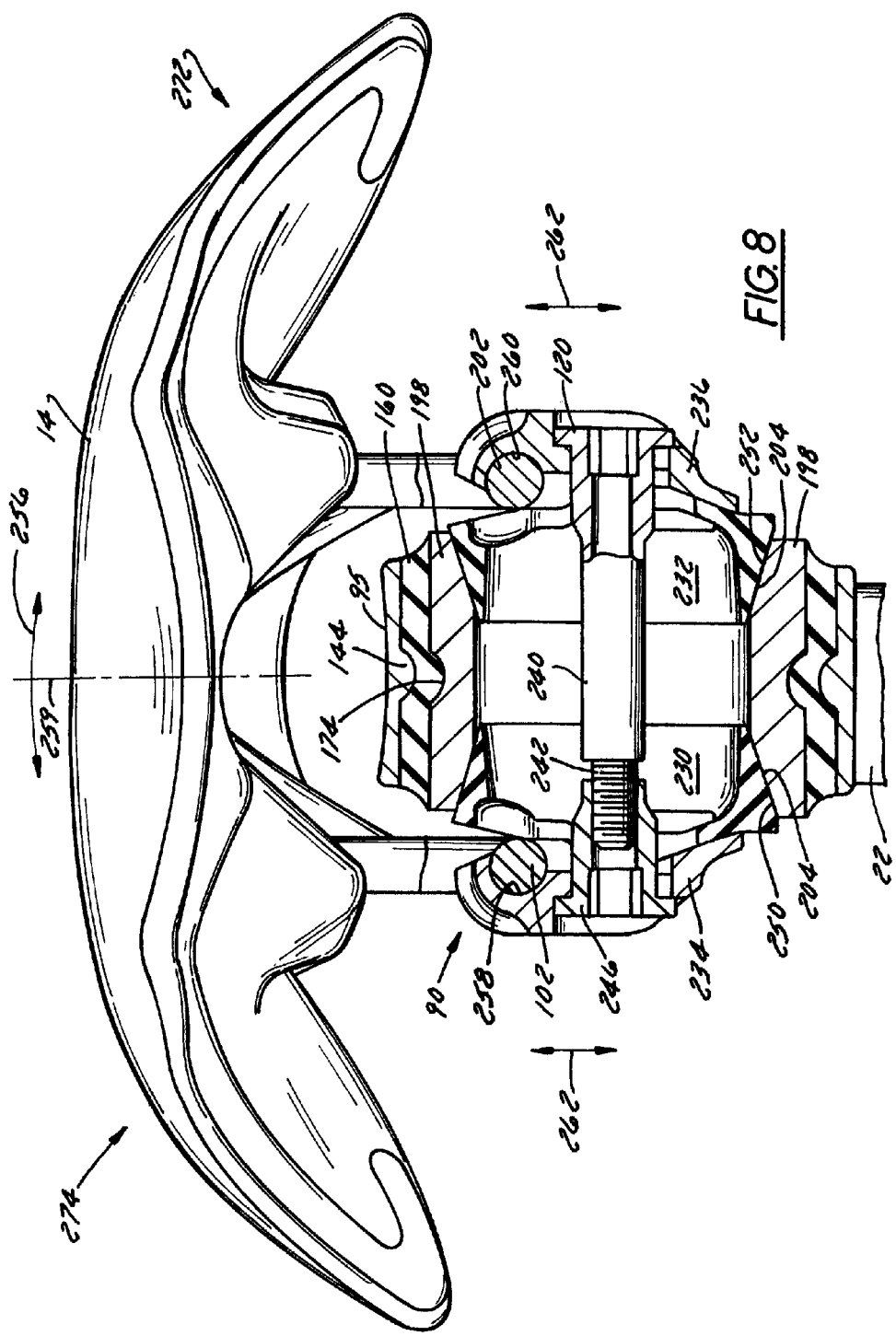
FIG. 8 is a cross sectional view of the suspension seat post assembly taken along line 8-8 shown in FIG. 2 with a seat engaged therewith.

Each clamp body 234, 236 includes a laterally inward facing rail groove 258, 260 that is configured to capture a corresponding seat rail 102 between a wedge and clamp body pair 231, 234 and 232, 236, respectively. As shown in FIG. 8, tightening of fastener 120 relative to shaft nut 246 decreases the lateral width associated with clamp bodies 234, 236. As fastener 120 is tightened, clamp bodies 234, 236 compress seat rails 102 between a corresponding clamp body 234, 236 and wedge body 231, 232 pair. Tightening of fastener 120 also biases tapered surfaces 250, 252 of wedge bodies 231, 232 into the tapered lands 204 of collar 190. It is appreciated that the frictional engagement between tapered lands and surfaces 204, 250, 252 fixes the rotational orientation of seat rails 102 relative to seat post 22.

Referring to FIGS. 3 and 8, hinge 220 prevents side to side lateral tipping, indicated by arrow 256 of seat 14 relative to the longitudinal vertical axis 259 of seat post 22. However, hinge 220 allows generally uniform and substantially vertical oscillation, indicated by arrows 262, of seat 14 relative to head portion 95 of seat post 22. Understandably, the position of hinge 220 with respect to seat tube 22 will determine the vertical and horizontal component of such oscillations as collar 190 rotates about axis 230 with respect to seat tube 22.

The hinged and dampened connection between seat 14 and frame 16 provides limited vibrational dampening of vibrations that could be communicated to a rider of bicycle 10 while maintaining the riders' ability to manipulate the bicycle via interaction with seat 14.

Therefore, one embodiment of the invention includes a bicycle seat post assembly having a seat post, a tube, a hinge, and a shock member. The seat post includes a first portion and a second portion. The second portion has an elongate shape formed about a longitudinal axis and is adapted to cooperate with a seat tube of a bicycle frame. A passage is formed through the first portion of the seat post about an axis that is oriented in a crossing direction relative to the longitudinal axis of the second portion. The tube is positioned in the passage and adapted to attach a bicycle seat to the bicycle frame. The hinge connects the tube and the seat post and defines an axis of rotation of the tube with respect to the seat. The shock member is positioned in the passage between the tube and the seat post and dampens movement of the bicycle seat relative to the bicycle frame.

Another embodiment of the invention that is useable with one or more of the features of the above embodiment includes a bicycle assembly having a frame with a seat tube formed between a front wheel and a rear wheel that are attached to the frame. The bicycle assembly includes a seat post assembly that includes a stem, a collar, a shock dampener, and a hinge. The stem has a head portion and a stem portion that telescopically cooperates with the seat tube of the frame. A passage is formed through the head portion of the stem and extends in a direction that crosses a longitudinal axis of the frame and the collar is positioned within the passage. The shock dampener extends about at least a portion of the circumference of the collar between the collar and the head portion of the stem. The hinge connects the collar and the stem and a seat is secured to the collar and rotatable about the hinge relative to the frame.

Another embodiment that can be combined with one or more of the features of the above embodiments includes a method of dampening motion between a bicycle seat and a bicycle frame comprising. A seat post is formed with an opening about an axis that extends in a crossing direction with respect to a longitudinal axis of a stem portion of the seat post. The stem portion is adapted to telescopically cooperate with a seat tube of a bicycle frame. A seat mount is passed through the opening of the seat post and a damper is positioned between the seat mount and the seat post. The seat mount and the seat post are connected with a hinge that has a hinge pivot axis that is parallel to the axis of the opening of the seat post.

The present invention has been described in terms of the preferred embodiment, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What is claimed is:
1. A bicycle seat post assembly comprising:
a seat post having a first portion a second portion, the first portion having an elongate shape formed about a longitudinal axis and adapted to cooperate with a seat tube of a bicycle frame;
a passage formed through the second portion about an axis that is oriented in a crossing direction relative to the longitudinal axis of the first portion;
a tube positioned in the passage and adapted to attach a bicycle seat to the bicycle frame;

a hinge that connects the tube and the seat post and defines an axis of rotation of the tube with respect to the seat post; and a shock member positioned in the passage between the tube and the seat post that dampens movement of the bicycle seat relative to the bicycle frame.

2. The bicycle seat post assembly of claim 1 further comprising a keyed interface between the shock member and at least one of the seat post and the tube, the keyed interface oriented in a plane that is generally transverse to the axis of rotation.

3. The bicycle seat post assembly of claim 1 further comprising a first keyed interface between the shock member and the seat post and a second keyed interface between the shock member and the tube.

4. The bicycle seat post assembly of claim 1 wherein the hinge is defined by a cavity formed in one of the tube and the seat post and a projection that extends from the other of the tube and the seat post into the cavity.

5. The bicycle seat post assembly of claim 1 wherein the shock member extends about the entire circumference of the tube.

6. The bicycle seat post assembly of claim 5 wherein the shock member has a non-uniform radial thickness with respect to its circumferential length.

7. A bicycle assembly comprising:
a frame having a seat tube formed between a front wheel and a rear wheel that are attached to the frame;
a seat post assembly comprising:
a stem having a head portion and a stem portion that telescopically cooperates with the seat tube of the frame;
a passage formed through the head portion of the stem and that extends in a direction that crosses a longitudinal axis of the frame;
a collar positioned within the passage;
a shock dampener that extends circumferentially about the collar between the collar and the head portion of the stem; and
a hinge that connects the collar and the stem; and
a seat secured to the collar and rotatable about the hinge relative to the frame.

8. The bicycle assembly of claim 7 further comprising a seat clamp that cooperates with the collar and secures the seat relative to the collar.

9. The bicycle assembly of claim 7 wherein the hinge is further defined as a projecting portion that extends in a radially outward direction from the collar and a barrel cavity that receives the projecting portion and is formed in the head portion of the stem.

10. The bicycle assembly of claim 9 wherein the barrel cavity is formed by an over-center configuration formed by the head portion of the stem.

11. The bicycle assembly of claim 7 further comprising at least one index formed along a circumferential interface between at least one of the collar, the shock damper, and the head portion of the stem, the index configured to laterally align the circumferential interface.

12. The bicycle assembly of claim 7 wherein the hinge prevents lateral side-to-side motion of the collar relative the stem but allows up-and-down movement of the collar relative the stem.

13. The bicycle assembly of claim 7 wherein the hinge is offset in one of a forward direction or a rearward direction from a vertical plane that passes through a longitudinal axis of the collar.

14. The bicycle assembly of claim 7 wherein the shock dampener extends about an entire circumference of the collar.

15. A method of dampening motion between a bicycle seat and a bicycle frame comprising:
forming a seat post with an opening that is formed about an axis that extends in a crossing direction with respect to a longitudinal axis of a stem portion of the seat post, the stem portion being adapted to telescopically cooperate with a seat tube of a bicycle frame;
passing a seat mount through the opening of the seat post;
positioning a damper between the seat mount and the seat post; and
connecting the seat mount and the seat post with a hinge having a hinge pivot axis that is parallel to the axis of the opening of the seat post.

16. The method of claim 15 further comprising offsetting the hinge pivot axis from the axis of the opening in a forward direction with respect to a vertical plane that contains the axis of the opening.

17. The method of claim 15 further comprising offsetting the hinge pivot axis from the axis of the opening in a rearward direction with respect to a vertical plane that contains the axis of the opening.

18. The method of claim 15 further comprising forming the opening with a first portion adapted to receive a first section of the seat mount that is adapted to receive a seat rail clamp and a second portion adapted to receive a second section of the seat mount, the second portion of the opening and the second section of the seat mount cooperating to form the hinge.

19. The method of claim 18 further comprising positioning the damper circumferentially about the first and second sections of the seat mount.

20. The method of claim 15 further comprising forming a groove that extends in a circumferential direction in at least one of a radially exterior surface of the seat mount, a portion of the seat post that faces the opening, a radially interior surface of the damper, and a radially exterior surface of the damper.

21. The method of claim 20 further comprising forming a rib that extends in a circumferential direction on at least another one of the radially exterior surface of the seat mount, the portion of the seat post that faces the opening, the radially interior surface of the damper, and the radially exterior surface of the damper, and shaping the rib to snuggly cooperate with groove.

* * * * *